United States Patent
Chalker et al.

(10) Patent No.: US 7,221,267 B2
(45) Date of Patent: May 22, 2007

(54) USER INTERFACE TO AID SYSTEM INSTALLATION

(75) Inventors: Matt D. Chalker, Dublin, CA (US); Jeffrey Kim, Berkeley, CA (US); Christina Woo, San Francisco, CA (US)

(73) Assignee: deCarta Inc., San Jose, CA (US)

( * ) Notice: Subject to any disclaimer, the term of this patent is extended or adjusted under 35 U.S.C. 154(b) by 273 days.

(21) Appl. No.: 10/726,982

(22) Filed: Dec. 3, 2003

(65) Prior Publication Data

US 2005/0125118 A1    Jun. 9, 2005

(51) Int. Cl.
*G08B 1/08* (2006.01)
(52) U.S. Cl. .............................. 340/539.1; 340/539.11; 340/506
(58) Field of Classification Search ............. 340/539.1, 340/539.11, 506, 539.24
See application file for complete search history.

(56) References Cited

U.S. PATENT DOCUMENTS

| | | | |
|---|---|---|---|
| 5,619,183 A * | 4/1997 | Ziegra et al. ............... | 340/505 |
| 5,671,158 A * | 9/1997 | Fournier et al. ................ | 345/8 |
| 6,317,039 B1 * | 11/2001 | Thomason ................... | 340/505 |
| 6,529,723 B1 | 3/2003 | Bentley ....................... | 455/405 |
| 6,591,094 B1 | 7/2003 | Bentley ....................... | 455/405 |

OTHER PUBLICATIONS

International Search Report (Jul. 26, 2006; PCT/US04/40514.
Written Opinion of the International Searching Authority (Jul. 26, 2006; PCT/US04/40514).

* cited by examiner

*Primary Examiner*—Daryl C. Pope
(74) *Attorney, Agent, or Firm*—Fenwick & West LLP

(57) ABSTRACT

A system and method is provided that allows an installer to obtain detailed installation instructions specific to the hardware to be installed as well as the system to which the hardware is to be installed. The instructions are provided to the installer via a user interface, the interface permitting the installer to efficiently complete the installation process. In addition to step-by-step instructions and/or visual installation aids, the system allows the installer to quickly obtain additional details relating to a specific subsystem or component.

11 Claims, 2 Drawing Sheets

USER INTERFACE TO AID SYSTEM INSTALLATION

FIELD OF THE INVENTION

The present invention relates generally to systems for communicating via a wireless network to selected devices and, more particularly, to a method and apparatus for providing a user interface that aids during the installation of a particular system or subsystem.

BACKGROUND OF THE INVENTION

It is common to modify vehicles, homes, commercial properties or other types of properties to suit the tastes and requirements of the user or owner. As such, it is often necessary to install new subsystems or modify existing subsystems after the user or owner has taken possession of the property. One such subsystem is an alarm system, for example a burglar or fire alarm.

For a variety of reasons vehicle alarm systems are particularly difficult to install. First, there are many different alarm manufacturers. Second, vehicle alarms can be configured to include any combination of a variety of different functions. Such functions may include, for example, door sensors, window sensors, motion sensors, location sensors (e.g., global positioning system (GPS) sensors), engine status sensors, CO sensors, $CO_2$ sensors, seat pressure sensors, floor pressure sensors, sound sensors, engine kill switches, position notification systems, alarm notification systems, local interfaces, etc. Third, vehicle alarm systems are continually changing due to the rapid advancements in related technologies. For example, only recently have GPS systems become a readily available alarm option. Fourth, there are literally thousands of possible vehicle configurations due to the large number of manufacturers, each offering a variety of different models, the models generally changing on an annual basis. Fifth, due to the sophisticated designs of most vehicles, especially those within the last decade, alarm installers face dramatic space constraints and increased difficulty in interfacing the alarm with the vehicle's subsystems (e.g., vehicle electronics used to diagnose and control the engine's performance).

For the reasons noted above, the installation of aftermarket hardware, especially vehicle alarms, has become a highly specialized skill. Installing such hardware typically requires the installer to repeatedly stop the installation process in order to review an alarm manual or schematic, review a vehicle manual or schematic, or contact the manufacturer of the vehicle, alarm or alarm component in order to obtain additional information. Adding to the installer's frustration is the fact that much of the alarm hardware must be installed in difficult to reach locations, thereby placing the installer in a variety of awkward positions. Requiring the installer to repeatedly stop the installation process to consult various installation sources means that the installer must continually move in and out of these awkward positions. As a result of the afore mentioned problems, alarm installations are often quite expensive, take longer to complete than expected, and are of inferior quality.

Accordingly, what is needed in the art is a means of simplifying the installation process, and in particular the installation process associated with alarm systems. The present invention offers such a means.

SUMMARY OF THE INVENTION

The present invention provides a method and system for allowing an installer to obtain detailed installation instructions specific to the hardware to be installed as well as the system to which the hardware is to be installed. The instructions are provided to the installer in any of a variety of ways, all of which allow the installer to efficiently complete the installation process. In addition to step-by-step instructions and/or visual installation aids, the installer is able to quickly obtain additional detail relating to a specific subsystem or component, all without changing positions.

In one aspect of the invention, a processing system is provided that is in communication with one or more user interfaces. The processing system, preferably a fully automated processing system, is coupled to an extensive data base. The data base can be comprised of a single data storage means or, as is preferred, multiple data storage means. Preferably the data base is routinely updated, thus providing the end user with access to up-to-date instructions, diagrams and other information. In at least one embodiment, when information is requested by an end user that is not within the data base, the processing system is capable of requesting the additional information from one or more external sources (for example using automated telephony, Internet links, preprogrammed inquiry links, etc.).

In another aspect of the invention, a user interface is provided which takes any of a variety of forms. The user interface can be designed specifically for use with the present invention. Alternately, the user interface can be designed to offer the user multiple functions (e.g., PDA, cellular telephone, user interface). Alternately, the user interface can be designed for another purpose (e.g., cellular telephone) but adapted for use with the present invention. The user interface includes one or more means for the user to input information into the system, such information typically including instruction requests, hardware specifics and system specifics. The user interface also includes one or more means for the user to receive information from the system, such information typically including instructions, schematics, flow charts, illustrations, and pictures.

A further understanding of the nature and advantages of the present invention may be realized by reference to the remaining portions of the specification and the drawings.

DESCRIPTION OF THE SPECIFIC EMBODIMENTS

The present invention overcomes the problems of the prior art by providing installation personnel with detailed installation instructions via a user interface that enhances, not inhibits, the installation process. To accomplish this feat, the invention provides step by step instructions and/or visual aids that can be accessed during the actual installation process, minimizing if not altogether eliminating the need for the installer to interrupt the installation process in order to make a phone call to a factory/company representative, review a manual, or consult with other personnel. This process is especially beneficial if the installation is physically demanding, for example requiring the installer to crawl under a vehicle (e.g., automobile alarm installation), enter a crawl space (e.g., residential or commercial alarm installation) or otherwise temporarily enter a difficult location or position. The invention also allows the installer to easily keep abreast of modifications in installation hardware and procedures as well as quickly obtain information about the specific system in which the hardware is to be installed (e.g., a particular automobile make and model). Furthermore, as a result of the invention, the installer receives detailed instructions at the time that the instructions are needed rather than undergoing needless, and often quickly forgotten, training.

Figure 1:
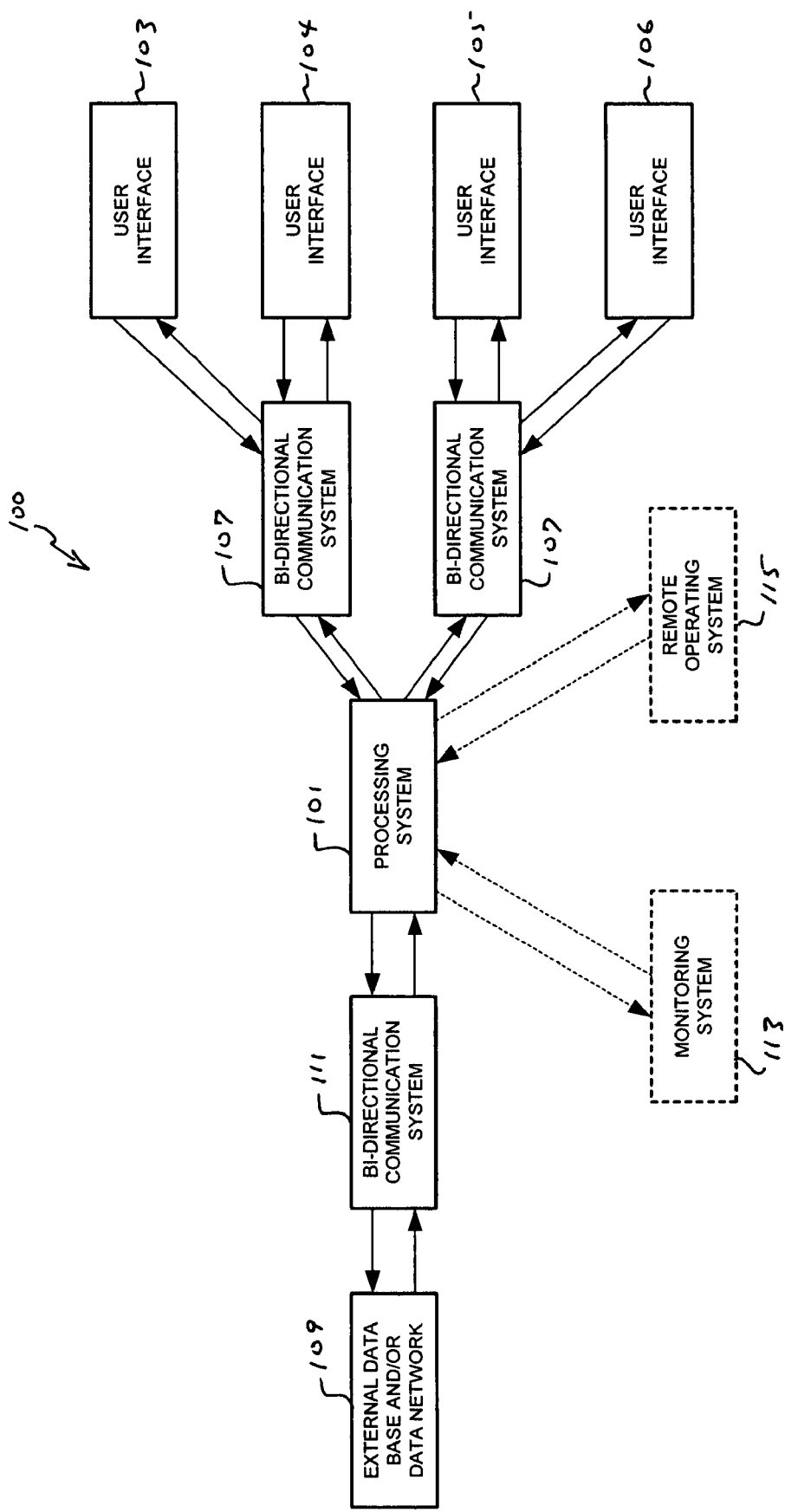
FIG. 1 is an overview of a user interface system in accordance with the invention.

FIG. 1 is an overview of a user interface system 100 in accordance with the invention. A processing system 101 provides the installer with the desired installation information via a user interface 103. Preferably processing system 101 is in communication with multiple user interfaces (e.g., interfaces 103–106). In the preferred embodiment processing system 101 is an automated system that minimizes, and preferably eliminates, the need for a human operator. As such the end user (e.g., installer) can obtain the desired information without speaking to a system operator or inputting data that must be reviewed by a system operator prior to providing the end user with a response.

As described in further detail below, user interface 103 can present information to the user audibly, textually and/or graphically and can utilize a variety of different forms and formats. Furthermore, user interface 103 can provide various degrees of user interaction. It will be appreciated that system 101 can communicate with fewer or greater numbers of user interfaces than those shown in FIG. 1 and that there may be substantial variations in the capabilities and the format of the individual user interfaces in communication with a single processing system. Preferably user interfaces 103–106 are much smaller than a laptop computer and more similar in size and weight to a cellular telephone or personal digital assistant (PDA), thus being completely portable in nature. By employing an interface of small size and weight that also includes wireless capabilities, the end user is able to utilize the interface regardless of the location of the installation process (e.g., under an automobile).

In contrast to a simple personal computer (PC) that can be configured to store and provide installation information to a local user, processing system 101 is remote from the user interfaces 103–106 and is preferably controlled/managed by an entity different from the end user. A PC can be used, however, as a means of linking a specific user interface to processing system 101. Preferably remote processing system 101 is independently located from the user interfaces, thus allowing system 101 to service user interfaces regardless of their location(s). As such, processing system 101 may be located miles, more preferably tens of miles, and still more preferably hundreds of miles from at least some of the user interfaces.

User interfaces 103–106 are coupled to processing system 101 via one or more bi-directional communication systems 107 (e.g., Public Switched Telephone Network or PSTN, cellular telephone network, wifi, etc.). Bi-directionality is required so that the end user can input a specific request to the processing system and then obtain the desired installation information. Multiple communication systems 107 are preferred in order to provide system redundancy and multiple means of communication. For example, one communication system may utilize a cellular telephone link while another communication system may utilize an Internet based link. It will be appreciated that the present invention is not limited to a specific type of communication system 107 and that both wireless and wired communication systems as well as combinations thereof are envisioned by the inventors.

Although processing system 101 can be self-contained, for example a simple computer system with an extensive data base, preferably system 101 provides a means for obtaining system and hardware informational updates from a variety of sources. Accordingly, in the preferred embodiment system 101 processes requests obtained from a particular user interface, obtains the requested information from either an internal or external source, and provides the information via the interface, thus acting as a conduit to obtain the desired installation information. In such an embodiment, processing system 101 is coupled to an external data base and/or network 109. In at least one embodiment, external data base/network 109 is a separate data base that is routinely updated by a third party, thus insuring that current hardware and system information is always available. In at least one other embodiment, external data base/network 109 is comprised of a network of data bases, preferably under the control of separate hardware manufacturers (e.g., automobile manufacturers, alarm manufacturers, sensor manufacturers, etc.). It will be appreciated that each such data base may contain a subset of available product/system information, the subset representing that data deemed appropriate for dissemination to processing system 101 or other potential recipients.

External data base/network 109 is coupled to processing system 101 via at least one bidirectional communication systems 111. Multiple communication systems 111 are desirable in order to provide system redundancy and multiple means of communication (e.g., cellular telephone link, Internet based link, etc.). It will be appreciated that the present invention is not limited to a specific type of communication system 111 and that both wireless and wired communication systems as well as combinations thereof are envisioned by the inventors.

A user interface in accordance with the invention will include at least one, and preferably more than one, input/output data means, thus enabling the user to communicate with the processing system 101, inputting specific requests or data and receiving instructions, data or other information. The input/output data means included on a specific interface will vary depending upon the intended use or uses as well as the interface's desired cost and size. A typical user interface will include one or more means selected from keys/buttons, switches, displays, touch-sensitive displays, speakers and microphones. Communication can be enhanced through the use of voice recognition and voice synthesis techniques.

It will be appreciated that a user interface in accordance with the invention can be designed specifically for use with system 100, designed for multiple uses (e.g., interface, cellular telephone, personal digital assistant or PDA, etc.), or designed specifically for use with a system other than 100 (e.g., cellular telephone). The first design allows the interface's features and capabilities to be best exploited. For example, it may be desirable to include a large, full color display, thus allowing schematics and representative photographs and schematics to be presented to the user. The second design allows the usefulness of the interface to be maximized by providing the user with a device that can serve multiple functions. The third design, while possibly providing the user with a less optimized interface, minimizes the initial system cost while providing the user with an interface for which they may already be familiar, thus accelerating acceptance by the intended end-users.

Figure 2:
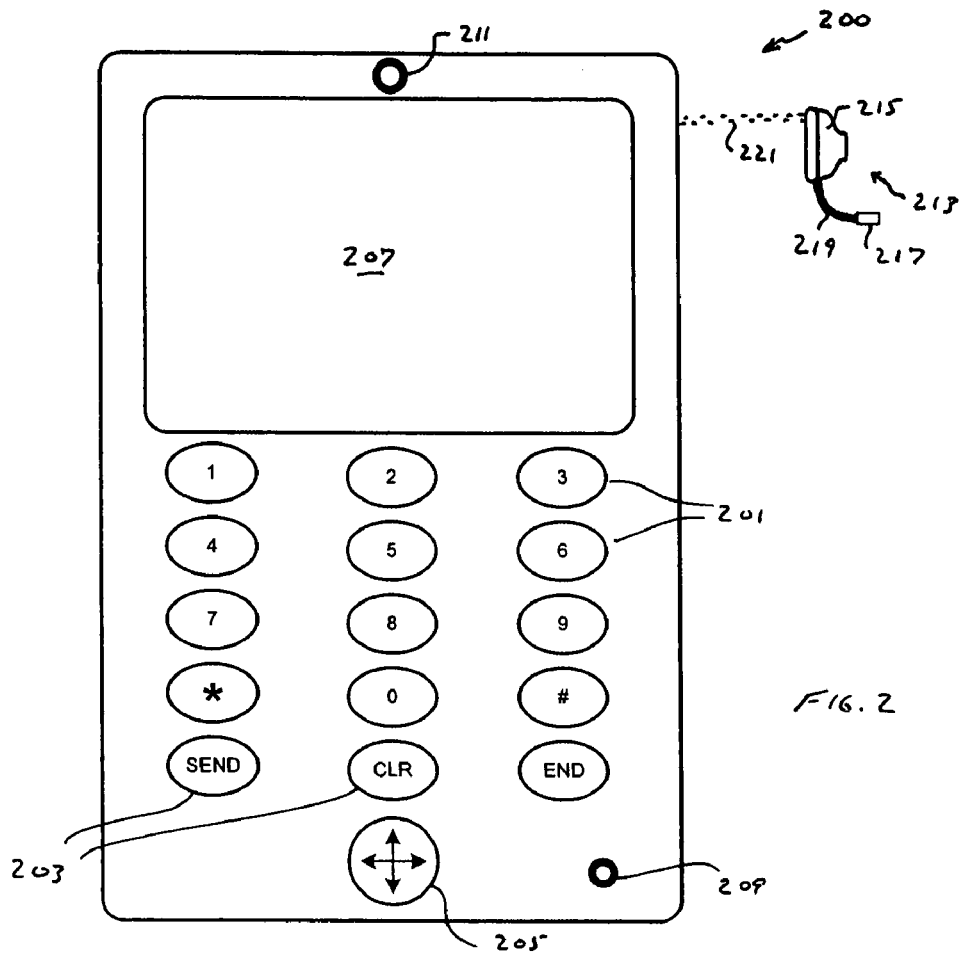
FIG. 2 is an illustration of a representative user interface.

FIG. 2 is an illustration of a representative user interface 200. It will be appreciated that interface 200 is only meant to illustrate some of the functionality of the interface, not limit its design. As shown, interface 200 includes keys 201 arranged in a standard configuration, each of these keys capable of inputting several different alphanumeric characters. For example, one of keys 201 may be capable of inputting a "2", an "a", a "b" or a "c". The interface can allow the user to select the desired character, for example by using an "enter" key or through the use of multiple key presses, i.e., one press represents "2", two presses in rapid succession represents "a", etc. Alternately, interface 200 can include a disambiguating system that interprets keystroke sequences. Alternately, keys 201 of interface 200 can form a miniature keyboard with a full set of keys, for example utilizing a QWERTY layout. It will be appreciated that there are countless variations of key-based input means which are well known by those of skill in the art. Accordingly, further explanation will not be provided herein.

Interface 200 may also include other "command" keys 203, thus providing the user with additional control over the communication process. Examples of such keys include keys that perform the functions of send, clear, on/off, end, enter, and space. Keys with more complex attributes may also be included, especially if interface 200 serves multiple functions. For example, if interface 200 has dual functionality as previously described, a key or switch may be used to determine the functionality of the interface. Alternately, one or more keys can be used to determine the functionality of other keys, for example determining if a specific key stroke is interpreted as a numeric character, a letter character, a symbol or a function.

Interface 200 may include one or more multi-directional switching means 205 such as 4-way thumb pads, 5-way thumb pads, mouse pads and scroll wheels. Multi-directional switching means 205 can be used to select specific functions. Switching means 205 can also be used to alter positions within previously written text. In some embodiments, means 205 can be used to identify specific locations on an interface associated display screen. In yet other embodiments, means 205 can be used to draw simply figures and/or schematics on an interface associated display screen.

Interface 200 preferably includes a display 207. Display 207 may either offer limited capabilities (e.g., black and white) or more extensive capabilities (e.g., a full color display). Display 207 can be used to augment an instruction provided by processing system 101, for example by providing a schematic (electronic, mechanical, etc.), a line illustration or a picture. Alternately display 207 can provide the user with textual messages, thus allowing the user to repeatedly review the message while performing the described operation. Display 207 can also be used to display the information (e.g., request, data) input by the user, thus allowing the user to easily make alterations prior to submitting the information to processing system 101.

In at least one embodiment of the invention, display 207 is a touch-sensitive screen. Preferably the user inputs data and selects functions using the touch-sensitive screen. The user may, for example, be provided with a series of "screens" depending upon the desired functionality. Thus one screen could be a miniature keyboard, allowing the user to input requests or data via "typing". Another screen could be a test procedure, whereby selecting an item of the test procedure causes the initialization of the selected procedure. Another screen could be an installation checklist whereby selecting an item from the checklist provides the user with detailed information relating to the selected item, preferably through one or more supplemental screens. Another screen could be an illustration of the hardware (e.g., alarm) to be installed, whereby selecting an illustrated component of the hardware causes the processing system/interface to provide detailed information about the component and/or detailed information about its installation. Another screen could be an illustration of the system (e.g., automobile electrical systems, automobile mechanical systems, etc.) to which the hardware is to be installed, whereby selecting an area or a component shown in the system diagrams causes the processing system/interface to provide additional detail to the user.

Preferably interface 200 includes a microphone 209 and a speaker 211, thus allowing the user to communicate with processing system 101, for example via a combination of speech inputs and voice prompts. Preferably microphone 209 and speaker 211 are designed for use in situations in which the user simply places interface 200 down near the work area and communicates thereafter by speaking in the general direction of microphone 209 and listening to the audible instructions from speaker 211. Accordingly such an embodiment typically requires heightened microphone sensitivity, directional sensitivity and noise cancellation means. Such an embodiment also requires that speaker 211 is capable of operating at sufficient volume levels and fidelity to be used in a typical hardware installation environment. One of the benefits of this embodiment is it allows the user complete mobility and hands-free operation.

In another embodiment of the invention, user interface 200 provides the user with hands-free operation through the inclusion of a two-way earpiece 213 consisting of an earphone speaker 215 and, preferably, a microphone 217. Microphone 217 can be attached to a boom 219 as shown, or integrated into earpiece 213. Earpiece 213 can either be coupled to interface 200 using a cable 221 (shown in phantom) or, as in the preferred embodiment, using a short distance wireless networking technology such as Bluetooth or IEEE802.11. As such technologies and standards are well know in the art (see, for example, the specifications found at www.bluetooth.com, www.standards.ieee.org/getieee802/802.11.html and www.grouper.ieee.org/groups/802/11/, all of which are incorporated herein by reference), further description will not be provided herein.

To further enhance system 100, specifically minimizing and/or eliminating the reliance on human operators, preferably system 100 includes voice recognition and voice synthesis capabilities. As such, the user of an interface (e.g., interface 103–106 and 200) inputs requests or data, for example via microphone 209 or microphone 217, and the voice recognition system translates the information to a form of data compatible with processing system 101. In turn, processing system 101 supplies the requested information to the user via speaker 211 or earphone 215, the information being synthesized with a voice synthesis system. Voice recognition and synthesis capabilities can be resident in either the individual interfaces or processing system 101 although the latter approach is generally more efficient and therefore cost effective. As voice recognition and synthesis systems are well know, further description will not be provided herein.

Figure 3:
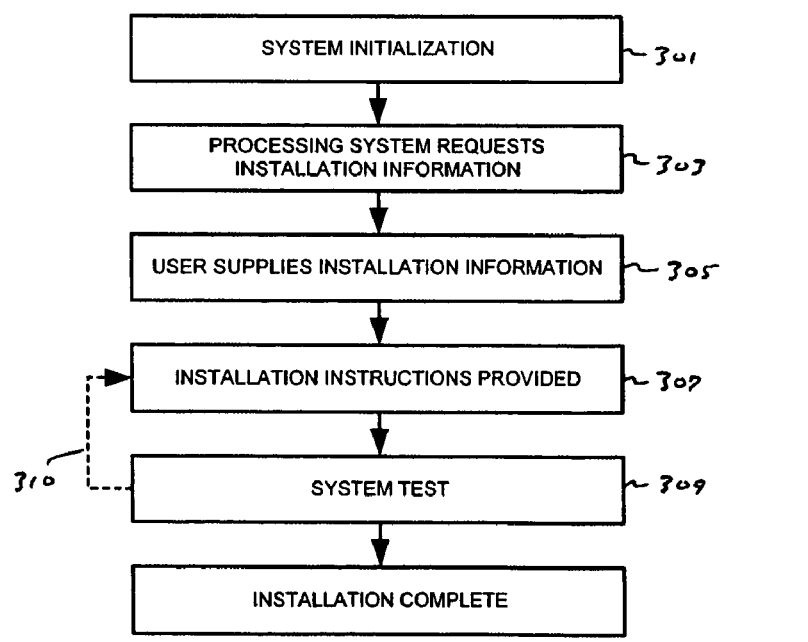
FIG. 3 illustrates the methodology of the invention.

Although the invention has been described generally in terms of its capabilities, components and processes, FIG. 3 adds further clarification by illustrating a specific embodiment. It will be appreciated that there are countless variations of the invention, depending upon the exact implementation of the system, the communication links, the interface capabilities and the desired application.

In the illustrated embodiment, when the user is ready to perform an installation, the first step is to initialize the system (step 301). System initialization typically includes the steps of powering-up the user interface and initializing the communication link between the processing system and the interface. System initialization may also require the interface to identify its communication capabilities (e.g., display availability, microphone/speaker capabilities, etc.). Once the system has been initialized, the processing system requests information relative to the intended installation (step 303). Depending upon the information provided during the system initialization step, the processing system may also request information about the user interface as well as the user's communication preferences (e.g., voice versus text). The user then inputs the requested information (step 305). Steps 303 and 305 can be done iteratively, for example by having the user respond to individual questions as they are presented. The benefit of this approach is that it allows relatively complex systems, or systems that can be modified in countless ways, to be easily handled by even a relatively untrained installer. Thus, for example, the user may first be asked the type of hardware to be installed (e.g., car alarm), then the model of the hardware (e.g., alarm x), then the desired configuration of the hardware (e.g., GPS, engine ignition kill switch, silent alarm, 2 doors, etc.). Alternately, the processing system can provide the user with a set of questions, for example in tabular form, requiring the user to input all of the necessary information in one step. Although the example above only referred to the hardware to be installed, it will be understood that similar information will be required for the system to which the hardware is to be installed (e.g., automobile make, model, year, configuration, etc.).

Once processing system 101 has been informed of the interface capabilities, user preferences, and the hardware and system information, processing system 101 then provides the user with instructions for installing the hardware into the system (step 307). It will be appreciated that there are countless variations on the format and sequence of these instructions and the present invention is not limited to a single format or sequence. A few examples of suitable instruction formats and sequences include:

(i) Processing system 101 requests format and sequence information from the user via the user interface, preferably providing the user with possible formats and sequences based on the hardware capabilities of the interface as well as the installation hardware, system on which the hardware is to be installed, and the desired final configuration. In at least one embodiment the processing system provides the user with a preferred format/sequence.

(ii) Processing system 101 displays on the interface screen a checklist of the components to be installed. From the list, the user identifies the component to be installed, for example by verbal instructions (e.g., saying "number 5" into a microphone associated with the interface), inputting a step number with an interface key (e.g., pressing the number "5" on the keypad) or selecting the step on the display screen (e.g., by moving a cursor to step 5 and pressing enter). The processing system, via the interface, then provides the user with detailed instructions as to the installation of the selected component. The detailed instructions may consist of schematics such as those of the electrical system, mechanical illustrations indicating hardware mounting locations, and/or step-by-step installation instructions. Preferably the interface allows the user to pause the installation instructions at will, for example by pressing a pause button or speaking the word "pause" into the interface's microphone. Alternately, the system may pause automatically, waiting to provide further instructions until the user presses a key corresponding to a "next" command or states a word (e.g., "next") corresponding to this command.

(iii) Processing system 101 provides step-by-step instructions orally, through either a speaker or earphone associated with the interface. The user is provided with a set of verbal commands such as "stop", "pause", "repeat", "start", "skip" and "next" in order to control the speed by which the instructions are given. Preferably the system also includes commands such as "detail" which provide additional detail relating to the current step.

(iv) Processing system 101 provides a schematic of the hardware to be installed. The user selects the component for which detailed instructions are desired, for example by identifying and selecting the component on the display screen (e.g., moving a cursor to the component and pressing an "enter" key or double pressing on the component if the screen is touch sensitive). Other identification techniques may include an interface keypad or oral means (e.g., speaking the number of the component into a microphone associated with the interface). Processing system 101 then provides the requested installation instructions verbally (e.g., using an interface speaker or earphone), textually (e.g., using the display screen) or graphically (e.g., pictures, lines drawings or schematics presented on the display screen).

As will be apparent from the above description, instructional sequences can be selected automatically by processing system 101 or selected by the user via the interface. User selection may be based on information and/or preferred sequences provided by the processing system or based on the user's own interests, preferences, or experience. Additionally, either complete step-by-step installation instructions can be provided or the instructions can be limited to specific components and/or issues identified by the installer.

The present invention also provides a convenient method of testing the installed hardware (step 309) or portions/components thereof while the installer is still in a position to easily modify the installation or repair/replace a component. For example, in one embodiment the hardware to be installed may include a global positioning system (GPS). As opposed to waiting until the entire hardware system is installed prior to testing, the installer can install the GPS system and then immediately request that the processing system test the GPS unit, the request being made via the user interface. If the unit does not accurately provide the requested positional information, the installer can easily either replace or service the unit. In another embodiment, the hardware system may include a monitoring and reporting system, thus allowing the system to notify the system's owner, emergency personnel (e.g., police, fire department) or others whenever a notification event occurs such as the unauthorized opening of a door. The present invention allows the installer to notify processing system 101 that a particular function on the hardware that is being installed is about to be tested (e.g., door switch). The installer can then operate the component or function under test. Processing system 101 notifies the installer via the user interface whether or not the hardware is operating properly. If it didn't, the installer is still conveniently positioned to modify and/or replace the questionable hardware. In yet another embodiment, the hardware may include a means of altering the operation of the system to which it is attached. For example, if the hardware is a car alarm, the alarm system may include an engine kill switch that can either be programmed to operate automatically when an alarm event occurs, or operate under the command of a remote alarm monitoring service. The present invention allows the installer to connect the engine kill switch and then request that the processing system remotely test the hardware's operation. If the test shows that the system is not operating properly, the installer is still in position to adjust and/or repair the hardware. In yet still another embodiment, the hardware is designed to be calibrated after installation through a series of steps alternating between hardware testing and adjustment. In this embodiment the installer can perform the repetitive adjustment process while remaining conveniently located near the installation hardware, using the user interface to remotely test and/or adjust the hardware.

In an alternate embodiment of the invention, in addition to testing installed hardware as previously described, the system can be used to actively track and record the results of the installation tests. This information can be used in a variety of ways. For example, the information can be used to certify that the hardware was properly installed and tested by the installer, thus providing the end user with a certain level of comfort that the installation was finished and that the system performed as intended.

It will be appreciated that installation can be completed prior to performing any hardware test/calibration steps or, alternately, the installation and test/calibration steps can be performed iteratively (step 310).

In the preferred embodiment of the invention processing system 101, in addition to providing installation instructions, schematics, etc., also monitors the operation of the installed hardware and can, as needed, interact with the installed hardware (e.g., for testing, calibration, remote operation, etc.). Therefore in this configuration processing system 101 can perform the monitoring, remote operation and remote calibration steps described in the illustrations above. Examples of an automated remote monitoring and notification system such as could be integrated with the present invention are disclosed in U.S. Pat. Nos. 6,529,723 and 6,591,094, the disclosures of which are incorporated herein for any and all purposes. In an alternate embodiment, processing system 101 is in communication with a separate remote monitoring system 113 and a separate remote operating system 115. Alternately, monitoring system 113 and remote operating system 115 can be combined into a single system that is separate from processing system 101.

As previously noted, the present invention can be used to aid in the installation of a variety of different types of hardware, although the inventors envision that it will be of most benefit in those situations in which the hardware is relatively complex and/or the installation process is relatively difficult, for example due to the location in which the hardware, or portions thereof, must be mounted and/or coupled. In the preferred embodiment, the hardware is an alarm and the system to which it is to be attached is an automobile. The invention is particularly well suited to this application due to the various alarm types and configurations as well as the number of automobile manufacturers, models and annually changing designs.

If the hardware to be installed is an alarm system, the hardware will typically be comprised of one or more sensors such as motion sensors, door sensors (e.g., door opened/closed), door lock sensors, window sensors (e.g., window opened/closed), car roof sensors (e.g., convertible up/down, sun-roof opened/closed), electric load sensors (e.g., lights on/off), engine status sensors, speed sensors, occupant sensors (e.g., pressure sensors located within the vehicles seats), etc. In at least one embodiment the sensors utilize an Intelligent Data Base or IDB. The IDB is a peer to peer data network available for use in automotive devices and other ground vehicles which has access to important vehicle systems, such as the vehicle's electrical system and components. In at least one other embodiment the sensors utilize an On-Board Diagnostic system or OBD. The OBD system provides a means of diagnosing engine problems and controlling engine functions.

The alarm system can also include one or more device controllers for controlling various functions of the systems to which they are attached. For example, the controllers can be used to remotely lock/unlock doors, close/open windows, close/open convertible top, close/open sun-roof, turn on/off lights, enable/disable engine, enable/disable ignition switch, activate a cellular phone within the passenger compartment of the vehicle, etc.

The alarm system can also include a local interface comprised, for example, of a keypad and one or more indicators (e.g., status indicators, localized alarm indicators such as a siren, bell, lights or a horn, etc.). Depending upon the desired function, the indicators can be visual or audible in design.

The alarm system can also include means for notifying a central operations center whenever there is an occurrence of a predetermined condition or alarm event (e.g., vehicle break-in, vehicle movement, fire, etc.). The alarm's sensors can detect the alarm event, for example by monitoring the condition of the doors, windows, engine, ignition switch, seat pressure, vehicle movement (e.g., speed or positional changes), engine tachometer, smoke detectors, $CO_2$ detectors, etc. The central operations center can be contained within processing system 101 or be separately maintained and located.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A method of communicating alarm installation instructions to a user, the method comprising the steps of:
   receiving a set of alarm hardware specifications corresponding to an alarm system
   by a remote processing system from a wireless user interface;
   receiving a set of vehicle specifications corresponding to a particular vehicle to which said alarm system is to be installed by said remote processing system from said wireless user interface;
   obtaining a set of installation instructions from a data base coupled to said remote processing system, said set of installation instructions particular to said set of received alarm hardware specifications and said set of received vehicle specifications;
   receiving a set of interface capabilities by the remote processing system from the user interface; and
   subsequent to receiving the set of interface capabilities, transmitting said set of installation instructions to said wireless user interface from said remote processing system.

2. The method of claim 1, further comprising the steps of:
initializing said remote processing system; and
transmitting a request for said set of alarm hardware specifications and said set of vehicle specifications to said user interface from said remote processing system.

3. The method of claim 1, further comprising the step of periodically updating said set of installation instructions in said data base to reflect changes in available alarm hardware and available vehicles.

4. The method of claim 3, wherein said periodic updating step is performed automatically.

5. The method of claim 1, further comprising the steps of:
receiving a request from said user interface to perform a test on a specific aspect of said alarm hardware; and
initializing a test sequence designed to perform said test on said specific aspect of said alarm hardware, wherein said test sequence is initialized by said processing system.

6. The method of claim 5, further comprising the steps of:
monitoring said alarm hardware; and
transmitting results of said test sequence to said wireless user interface from said remote processing system.

7. The method of method of claim 1 wherein transmitting said set of installation instructions to said wireless user interface from said remote processing system further comprises:
receiving a set of alarm hardware specifications corresponding to an alarm system by a remote processing system from a wireless user interface;
receiving a set of vehicle specifications corresponding to a particular vehicle to which said alarm system is to be installed by said remote processing system from said wireless user interface;
obtaining a set of installation instructions from a data base coupled to said remote processing system, said set of installation instructions particular to said set of received alarm hardware specifications and said set of received vehicle specifications;
transmitting an initial portion of said set of installation instructions to said wireless user interface from said remote processing system;
transmitting a request for an additional portion of said set of installation instructions to said remote processing system from said wireless user interface; and
transmitting said additional portion of said set of installation instructions to said wireless user interface from said remote processing system in response to said transmitted request, wherein said steps of transmitting requests for additional portions of said set of installation instructions and transmitting additional portions in response to said transmitted requests are performed at least once.

8. The method of claim 7, wherein said step of transmitting said initial portion of said set of installation instructions is performed in response to a step of transmitting said request for said initial portion of said set of installation instructions to said remote processing system from said wireless user interface.

9. The method of claim 7, wherein said step of obtaining said set of installation instructions from said data base comprises the step of obtaining said set of installation instructions in portions, wherein said portions correspond to said portions transmitted to said wireless user interface from said remote processing system.

10. A method of communicating alarm installation instructions to a user, the method comprising the steps of:
receiving a set of alarm hardware specifications corresponding to an alarm system by a remote processing system from a wireless user interface;
receiving a set of vehicle specifications corresponding to a particular vehicle to which said alarm system is to be installed by said remote processing system from said wireless user interface;
obtaining a set of installation instructions from a data base coupled to said remote processing system, said set of installation instructions particular to said set of received alarm hardware specifications and said set of received vehicle specifications;
receiving a set of interface communication preferences by the remote processing system from the user interface; and
subsequent to receiving the set of interface communication preferences, transmitting said set of installation instructions to said wireless user interface from said remote processing system.

11. A method of communicating alarm installation instructions to a user, the method comprising the steps of:
receiving a set of alarm hardware specifications corresponding to an alarm system by a remote processing system from a wireless user interface;
receiving a set of vehicle specifications corresponding to a particular vehicle to which said alarm system is to be installed by said remote processing system from said wireless user interface;
obtaining a set of installation instructions from a data base coupled to said remote processing system, said set of installation instructions particular to said set of received alarm hardware specifications and said set of received vehicle specifications;
transmitting said set of installation instructions to said wireless user interface from said remote processing system;
synthesizing said set of installation instructions into a set of audible instructions; and
audibly presenting said set of synthesized installation instructions via said user interface.

* * * * *